Sept. 22, 1936.  W. A. CARNES  2,055,335
BRAKE
Filed May 11, 1934

Inventor
William A. Carnes
By Hardway Cathey
Attorney

Patented Sept. 22, 1936

2,055,335

UNITED STATES PATENT OFFICE 2,055,335

BRAKE

William A. Carnes, Houston, Tex.

Application May 11, 1934, Serial No. 725,068

1 Claim. (Cl. 188—77)

This invention relates to brakes and has particular relation to brakes adapted for general use but which is particularly applicable for use on a cable winding drum for handling heavy loads such as the drum of draw works used on well drilling rigs.

An object of the invention is to provide brakes having ample braking surface and a novel type of brake band and novel brake drum with which the band cooperates and which may be readily adjusted to take up wear of the said band and brake drum.

Another object is to provide, in construction of this character, a novel type of cable winding drum.

With the above and other objects in view, this invention has particular relation to certain novel features of construction, operation and arrangement of parts, an example of which is given in this specification and illustrated in the accompanying drawing, wherein.

Figure 1:
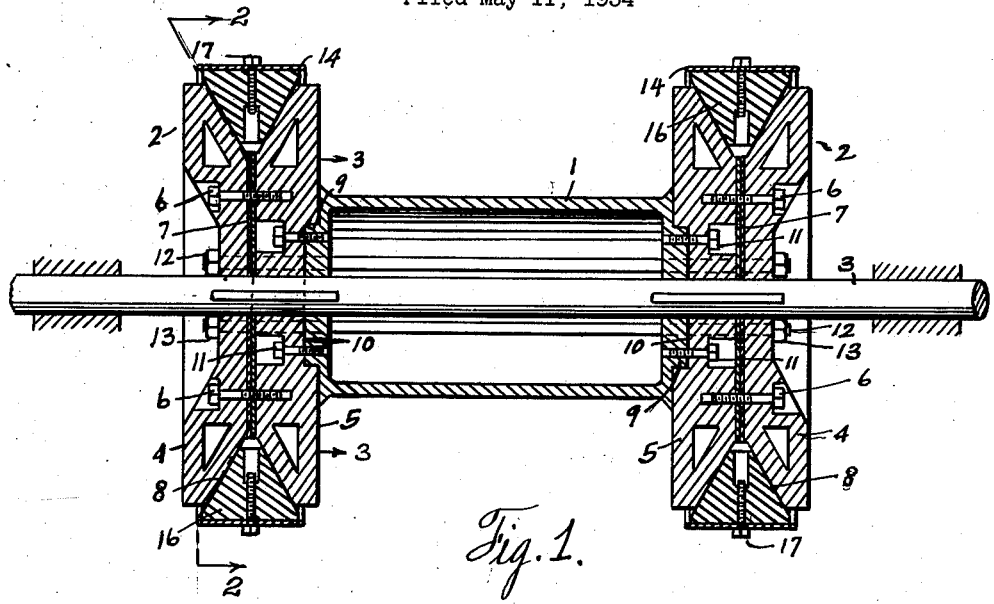
Figure 1 shows a longitudinal sectional view of a cable winding drum illustrating the invention.
Figure 2:
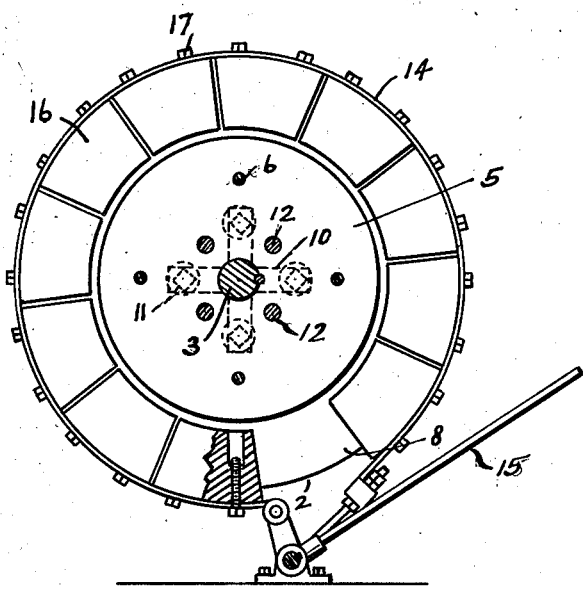
Figure 2 shows a cross sectional view taken on the line 2—2 of Figure 1.
Figure 3:
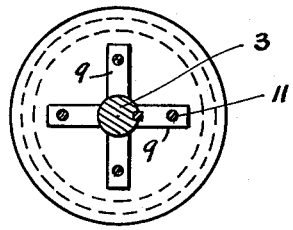
Figure 3 shows a fragmentary cross sectional view taken on the line 3—3 of Figure 1.

Referring now more particularly to the drawing wherein like numerals of reference designate similar parts in each of the figures, the numeral 1 designates a cable winding drum whose ends are formed with brake drums designated generally by the numerals 2, 2. The assembly is splined on a suitable shaft 3. Each brake drum is formed of the outer and inner sections 4, 5 suitably bolted together by the bolts 6. Between the sections of each brake drum are the circular shims as 7. The margins of an outer and inner sections 4, 5 of each brake drum are flared outwardly to form the surrounding brake surface 8 approximately V-shaped in cross sectional contour. The cable winding drum has the end ribs 9, 9 preferably arranged at approximately right angles to each other and seated in the correspondingly arranged grooves 10 in the inner sections 5 of the brake drums. The said sections 5 may be secured to the respective ends of the drum 1 by the set bolts 11 and the brake drums are secured to the cable winding drum 1 by means of the rods 12 which are fitted through the brake drums and pass also through the cable winding drum and whose ends are threaded to receive the securing nuts 13 whereby the parts are maintained in assembled relation.

Around each brake drum there is a suitable brake band 14, which may be contracted or expanded by means of the brake lever 15 operatively connected with said band in the conventional manner. A series of brake shoes 16 is secured to the inner side of each band and are shaped to conform to the shape of and to fit in the braking surface 8 around said drums 2. These brake shoes may be secured in place by means of suitable set bolts as 17 and are formed of any suitable material such as reinforced asbestos or other suitable heat resisting material. The drums are preferably formed of suitable metal. The inner margins of the shoes 16 are truncated so as to allow for contraction of the band as the contacting braking surfaces wear.

In order to take up for wear, the outer section of a brake drum may be unbolted and moved outwardly on the shaft 3 and some of the shims 7 removed. These shims are made sectional for easy removal and upon removal of the shims said section may be bolted back in place.

It is obvious that the entire structure may be readily dismembered for handling and storage or shipment and may be readily assembled for use.

The drawing and description disclose what is now considered to be a preferred form of the invention by way of illustration only, while the broad principle of the invention will be defined by the appended claim.

What I claim is:

In a draw works a cable winding drum, having a brake drum thereon, said brake drum being formed of only two similar sections spaced apart and having parallel bearing faces and whose margins are formed with diverging brake surfaces, spacing means between the sections and extending throughout the area of the bearing faces, bolts fitted through one section, and through the spacing means, said bolts having heads which engage the last-mentioned section and having a threaded connection with the other section, a brake band around the brake drum having diverging brake surfaces arranged to cooperate with the brake surfaces of the brake drum and means for contracting and expanding said band.

WILLIAM A. CARNES.